United States Patent [19]

Hyman et al.

[11] 4,103,325
[45] Jul. 25, 1978

[54] AIRCRAFT POWER AND PHASE CONVERTER

[75] Inventors: Charles E. Hyman; Alfred C. Setter, both of Phoenix, Ariz.

[73] Assignee: Sperry Rand Corporation, New York, N.Y.

[21] Appl. No.: 779,214

[22] Filed: Mar. 18, 1977

[51] Int. Cl.² .............................................. H02M 5/293
[52] U.S. Cl. .................................................. 363/148
[58] Field of Search ........................... 363/1, 2, 4, 9, 36, 363/148, 149, 151–156

[56] References Cited

U.S. PATENT DOCUMENTS

| 2,673,954 | 3/1954 | Smith | 363/149 |
| 2,968,757 | 1/1961 | Leon | 363/156 |

Primary Examiner—A. D. Pellinen
Attorney, Agent, or Firm—Howard P. Terry

[57] ABSTRACT

A compact power and phase converter is adapted to utilize the single-phase and direct current power outputs of a conventional aircraft power supply, converting such outputs into stable three-phase power on wye-connected, grounded neutral distribution lines. An automatic current limiter provides overload protection for the converter when excessive output current is demanded.

7 Claims, 2 Drawing Figures

AIRCRAFT POWER AND PHASE CONVERTER

CROSS REFERENCE TO RELATED APPLICATION

The following co-filed application employs the same drawings and descriptions, claiming different features of the disclosed apparatus, and is assigned to Sperry Rand Corporation: Arland I. Olafson, Alfred C. Setter, U.S. patent application Ser. No. 779,421, filed Mar. 18, 1977 for Protected "Aircraft Power and Phase Converter."

BACKGROUND OF THE INVENTION

1. Field of the Invention

The invention generally relates to protected power conversion apparatus and is more particularly concerned with compact and inexpensive power conversion apparatus for employing the single-phase and direct current outputs of conventional airborne power supply to generate stable, regulated three-phase power signals on wye-connected grounded neutral, distribution lines.

2. Description of the Prior Art

Generally, airborne power supplies for aircraft navigation instrumentation and control systems have fallen mainly into two categories. For example, a first kind of voltage regulated supply furnishes only limited amplitude single-phase power, no three-phase power being generated. Relatively high levels of direct current power, such as at 28 volts, are also provided. For direct use in aircraft so equipped, instruments and controls for the aircraft are designed primarily for the use of direct current and secondarily for operation with single-phase alternating current.

On the other hand, many types of aircraft instruments and controls are purposely designed to operate primarily from a second class of power supply providing a relatively high power, three-phase output. Such supplies normally provide regulated 115 and 200 volt levels of alternating current on four-wire, grounded neutral, power distribution lines. A secondary provision of relatively lower power level direct current at, say, 28 volts, is also often made by the second class of power supply.

It is often desired to operate equipment designed for use with one such class of power supply with the other class of power supply, a situation requiring interconnecting power adaption or converting elements. In particular, the present invention is concerned with the operation of apparatus originally designed to operate with the foregoing second class of power supply and with converter means enabling it to operate safely and efficiently with the first class of power supply. For this purpose, inverters yielding three-phase energy have been employed in the past with some success; however, such inverters are expensive and heavy and excessively consume valuable space within the aircraft fuselage. Because of these and other disadvantageous factors, inverter systems do not represent an attractive solution to the problem.

SUMMARY OF THE INVENTION

The present invention provides an efficient and compact arrangement permitting aircraft instrumentation and control systems originally designed to operate primarily from three-phase power supplies to operate successfully and safely with aircraft power supplies yielding considerable direct current power but only limited power levels of single-phase alternating current. According to the invention, the single-phase output of the aircraft power supply is phase shifted to form quadrature voltages which are then subjected to power amplification before use to excite certain inputs of an output transformer system. The latter system combines the quadrature signals with the single-phase output of the supply as a reference to yield the three phase power on wye-connected, grounded neutral, distribution lines. Automatic feed back for gain control is provided so that the voltage stability of the three-phase output depends almost exclusively upon the regulation inherently provided by the single-phase alternating current supply. Additionally, novel protective output current limiting means provides overload protection for the output stages of the power converter against faults which may appear in the load causing it to demand excessive current levels.

DESCRIPTION OF THE PREFERRED EMBODIMENTS

Figure 1:
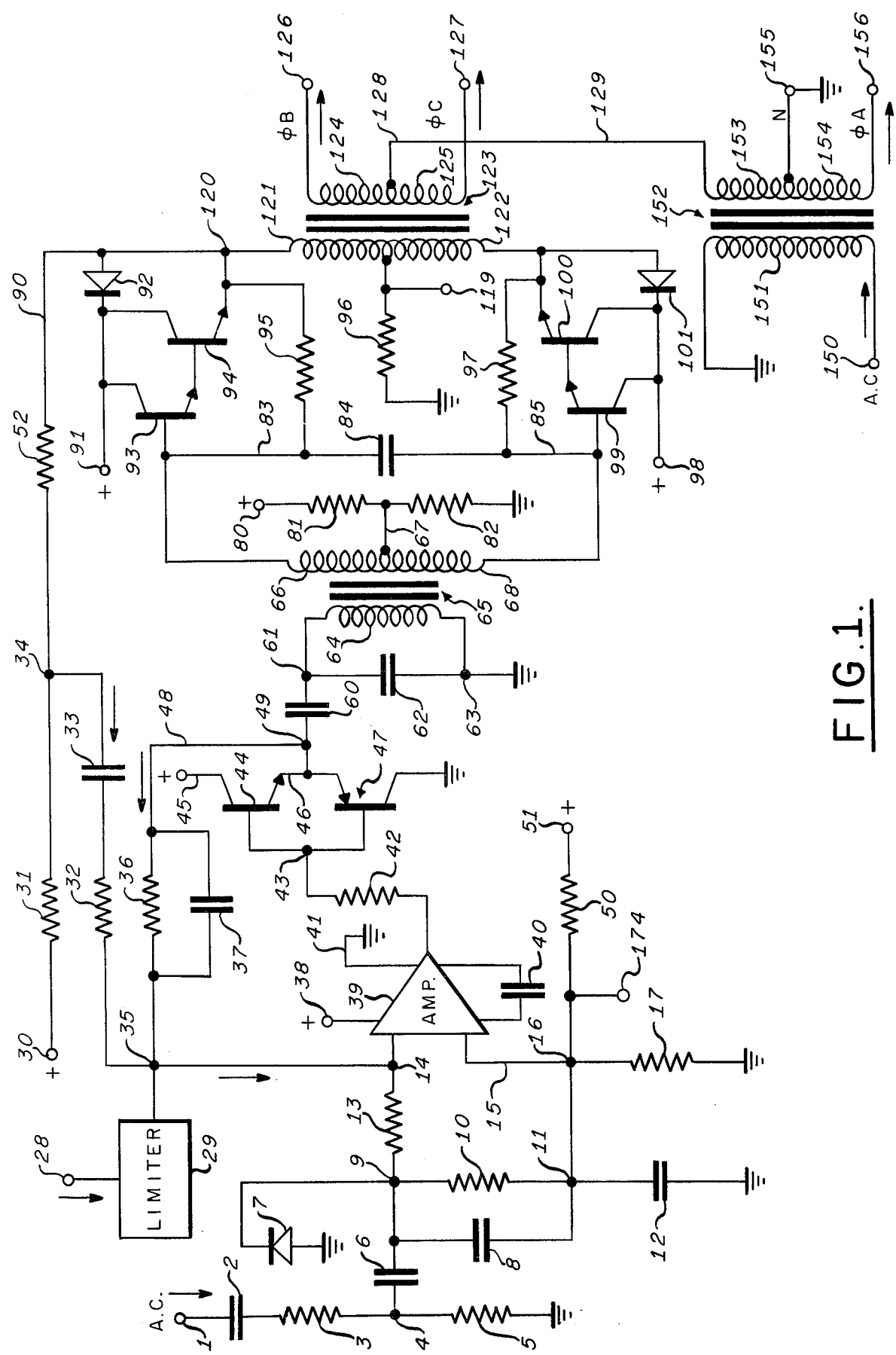
FIG. 1 is a detailed electrical wiring diagram of the invention.

The novel power and phase converter is illustrated in FIG. 1 wherein the single phase alternating power to be converted is applied to terminals 1 and 150 (which may both be a common terminal) and three-phase alternating power is found on output terminals 126, 127, 155 and 156. Single phase alternating power is coupled to terminal 1, where it acts mainly to supply a phase and frequency reference signal for the invention, terminal 1 being connected serially through capacitor 2, resistor 3, junction 4, and resistor 5 to ground. Junction 4 is connected by coupling capacitor 6 to junction 9 which is in turn coupled, first of all to ground through a diode 7 poled as indicated in the drawing. Secondly, junction 9 is coupled by the parallel circuit made up of capacitor 8 and resistor 10 through junction 11 and capacitor 12 to ground. The circuit involving these elements forms a conventional 90° phase shifter for the input operating alternating signal, which in many installations will be 400Hz, and serves to pass only a narrow band of frequencies about that desired center operating frequency. The several circuit elements are selected for good stability for the intended severe environment so that the phase shift will be substantially constant particularly over the expected wide range of temperatures. Capacitor 12 serves to provide an a.c. ground path for all a.c. frequencies. Diode 7 limits the voltage at junction 9 and protects amplifier 39 during the transitory condition immediately following application of power to the system where capacitors 2, 6, 8, 12, 33, and 37 draw large currents before reaching their steady state conditions.

Junction 9 of the phase shifting section is connected by coupling resistor 13 to one input 14 of the conventional voltage amplifier 39. Its second input 15 is directly coupled to junction 11 through junction 16, junction 16 being connected to ground through resistor 17 and through resistor 50 to a source (not shown) of positive bias voltage normally connected to terminal 51. The voltage at terminal 51 may be +28 volts supplied directly by the aircraft generator. The conventional amplifier 39 has four additional conventional terminals, terminal 38 also being supplied with +28 volts, for example while its terminal 41 is coupled to ground. A capacitor 40 used to suppress signals of frequency greater than the operating frequency is coupled in a conventional manner across two remaining terminals of amplifier 39. It will be understood that amplifier 39 serves both as a voltage and as a gain controlled amplifier, as will be further described.

The output of amplifier 39 is connected by coupling resistor 42 to the input junction 43 of a current buffering amplifier stage employing transistors 44 and 47, these transistors being connected for operation in the conventional complementary Class B push-pull fashion. For this purpose, junction 43 is coupled to the respective bases of transistors 44,47. The collector electrode of transistor 44 is normally coupled via terminal 45 to a positive source (not shown), which may also be +28 volts d.c. while the collector electrode of transistor 47 is coupled to ground. The two emitter electrodes are both coupled via lead 46 to output junction 49 from which there are two branching electrical leads. For feed back and gain control purposes, junction 49 is coupled via lead 48 through the parallel circuit made up of resistor 36 and capacitor 37 and through terminal 35 to the input 14 of voltage amplifier 39. This is primarily a stabilizing direct current feed back through resistor 36, capacitor 37 tending to cut off the transmission of signals of frequency above the operating frequency (above 400 Hz, for example).

The second branching output electrical lead from junction 49 is connected through a.c. coupling capacitor 60 to one end of primary 64 of isolation transformer 65, the other end of primary 64 being grounded. Capacitor 62, coupled across the terminals 61, 63 of primary 64 is used to suppress undesired high frequencies, as before. Transformer 65 is supplied with a secondary winding 66,68, center-tapped at 67, center tap 67 is coupled between series connected resistors 81 and 82, forming a voltage divider for biasing the bases of transistors 93, 99 and coupled between ground and a terminal 80 normally supplied with a bias voltage (say +28 volts d.c.). Transformer 65 acts as an isolating input to supply plus and minus 90° phase shifted a.c. signals to the bases of transistors 93 and 99; these transistors find themselves in a conventional push-pull power amplifier using stages of the so-called Darlington type. Input of undesired frequencies to transistors 93, 99 above the operating frequency (say, 400 Hz) is suppressed by capacitor 84 coupled by leads 83, 85 across the secondary 66, 68 of transformer 65.

The amplifier stage associated with transistors 93, 94 supplies an output at one end 120 of the primary section 121 of transformer 123. For this purpose, secondary 66 of transformer 65 is coupled directly to the base of transistor 93 whose collector electrode is normally coupled to a positive voltage source (not shown) at terminal 91 which may supply +28 volts. The collector of transistor 94 is also coupled to the supply at 91, its base to the emitter of transistor 93, and its emitter to end terminal 120 of primary winding 121. Additionally, end terminal 120 is coupled through a diode 92, poled as shown, for the purpose of prevention of reverse biasing events in transistors 93, 94, to the supply at 91. To complete the circuit, secondary 66 is also coupled via lead 83 and resistor 95 to end terminal 120, resistor 95 overcoming collector-to-base leakage effects in transistors 93, 94. The power amplifier stage composed of transistors 99 and 100 feeding the primary portion 122 of transformer 123 is analogous to that employing transistors 93 and 94, using corresponding elements including resistor 97, terminal 98, and diode 101 as will be readily seen by those skilled in the art, and its structure and operation will be apparent from the foregoing discussion. In this manner, the two quadrature sine wave voltages generated by transformer 65 are current buffered by the power amplifiers associated with transistors 93, 94 and 99, 100 and are applied to the opposite ends 121, 122 of the primary of transformer 123.

The secondary 124, 125 of transformer 123 is center-tapped at 128, tap 128 being supplied with an appropriate a.c. reference signal in view of the desired function of the output transformer system. To aid this operation, the signal phase a.c. signal applied to terminal 1 is also applied via terminal 150 to one end of the grounded primary 151 of transformer 152. Transformer 152 has a neutrally tapped secondary 153, 154 and the outer end of secondary portion 153 is coupled via lead 129 to center tap 128 of the secondary 124, 125 of transformer 123. In this type of connection, the four output terminals 126, 127, 155, 156 supply the desired three-phase, four wire, grounded-neutral power. With the grounded terminal 155 neutral, 115 volt power signals are found on the remaining three terminals; the phase $\phi A$ on terminal 156 is at the same phase as the reference on terminal 1, the phase $\phi B$ on terminal 126 is at 120° relative to the reference, and the phase $\phi C$ on terminal 127 is at 240° relative to the reference.

Again for stabilizing feed back purposes, terminal 120 at the power output stage is coupled back to the input terminal 14 of amplifier 39 via junction 35. In particular, the a.c. signal at terminal 120 is coupled via lead 90 and resistor 52 to junctions 34 and from that junction through the series circuit formed by resistor 32 and blocking capacitor 33 to terminals 35, 14. Thus, an a.c. feed back into amplifier 39 is provided for gain control and stabilization purposes. A positive bias voltage (say +28 volts d.c.) may be coupled from terminal 30 through resistor 31, resistors 31 and 52 beneficially setting up a bias at junction 34 so that the direct voltage levels on both plates of capacitor 33 are substantially equal.

As previously noted, the necessary phase stability of the three phase output power is ensured by selection of temperature stable components for use in the input phase shifter network. Precise voltage tracking of the input a.c. reference signal on junction 1 is also achieved according to the invention. The input alternating voltage level is used as a reference, since the voltage regulation of the aircraft power supply is normally a quite adequate standard. To ensure that the voltage stability of the three-phase output depends almost exclusively on alternating voltage input variations at terminals 1, 150, the automatic gain control feed back loops including elements 36, 37 and 32, 33 are provided, these functioning respectively as d.c. and a.c. feed back networks, allowing compensation of the output voltage level and its substantial correction by amplifier 39.

In FIG. 1, protection of the novel power converter against short circuits or other output current overloads is provided by current limiter 29 whose output is coupled to junction 35 and thereby to the input junction 14 of the gain controlling amplifier 39. The controlling input at terminal 28 of the protective current limiter 29 is derived at terminal 119 at the mid-point of transformer input winding 121, 122. This mid-point is coupled across a sensor resistor 96 to ground. Limiter 29 serves to monitor the voltage developed across sensor resistor 96, thereby detecting any demand for current at the output of the converter exceeding its safe capability. Thereupon, the power converter is forced into a safe operating or stand by mode. As a consequence, the φB and φC outputs at the respective terminals 126 and 127 then derive energy substantially only from transformer 152. The converter remains in this stand by mode until recycled after the excessive load is removed, the energy at terminals 1 and 150 having been removed and then having been re-supplied.

Figure 2:
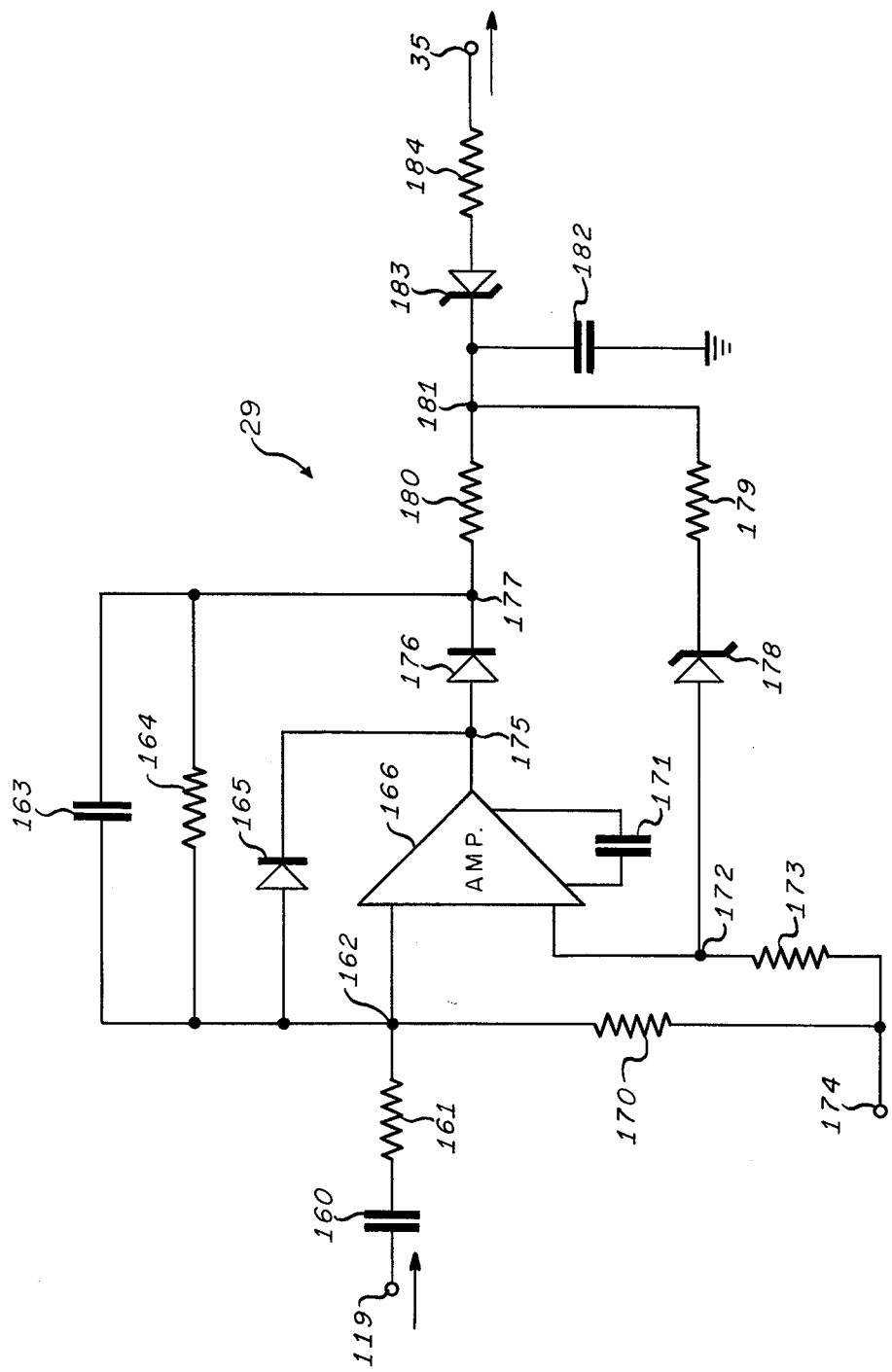
FIG. 2 is a detailed wiring diagram of the protective current limiter shown in FIG. 1.

Referring now to FIG. 2, the novel current limiter 29 will be considered in greater detail. Its normal input at terminal 119 consists of a direct current component and the full wave rectified signal (derived, say, from 400 Hz) developed across sensor resister 96. The d.c. blocking series capacitor 160 allows only the alternating signals to flow into the voltage divider composed of resistors 161, 170, resistor 170 being coupled to terminal 16 of FIG. 1. The same terminal 174 is connected through resistor 173 and junction 172 to one input terminal of a conventional operational amplifier 166, its second input terminal being coupled at junction 162 between resistors 161, 170 for receipt of a.c. signals passed by blocking condenser 160.

Thus, the voltage developed at junction 162 is applied to one input of operational amplifier 166, which amplifier is connected in the usual manner to permit it to operate as a conventional voltage comparator. A second input to the voltage comparator including amplifier 166 and found on junction 172 is derived from positive feed back current components, formed by the action of resistor 179 and Zener diode 178 and found at output junction 181. The control output signal of the voltage comparator including amplifier 166 is seen to be coupled through junction 175, diode 176, junction 177, and resistor 180 to junction 181. A diode 165 is coupled between junctions 162 and 175. The positive feed back elements 165, 176, 164 and 163 serve to provide positive rectification and filtration or smoothing of the differential input at input terminals 162 and 172 of the voltage comparator including amplifier 166. The consequent positive unidirectional signal at junction 177 is further filtered by the resistor-capacitor circuit 180–182. Capacitor 171 acts to suppress high frequency signals. In this manner, the low noise unidirectional signal at junction 181 represents a reliable measure of the current level demanded at the output terminals 126, 127 of FIG. 1 of the power converter, this signal being coupled through Zener diode 183 and resistor 184 to the power converter feed back junction 35.

When an abnormality appears in the load fed by the power converter and an excessive current magnitude is demanded of it, the voltage level at junction 181 increases accordingly. When the output current sensed by monitor resistor 96 becomes excessive, the unidirectional voltage level at junction 181 rises above a predetermined level (say, of +5.6 volts) and Zener diode 178 breaks down. As a consequence, there is heavy current flow through resistor 179 and diode 178. This event greatly unbalances the differential input at terminals 162, 172 to the voltage comparator including amplifier 166, causing its output to latch to, say, +28 volts. Circuit 166 acts as a normal gain amplifier with threshold positive feed back latch-up; circuit 166 acts like a normal gain amplifier until its output exceeds a predetermined voltage level, whereupon overwhelming positive feed back by the conduction of Zener diode 178 causes the output of the amplifier to saturate or to latch up at its positive supply voltage level (+28 volts). The signal at junction 181 instantaneously increases above a predetermined voltage level (say, +6.2 volts) with the consequent break down of Zener diode 183. Now, a large current must flow through Zener diode 183 and resistor 184 and into junction 35 to junction 14 and thence into amplifier 39 of FIG. 1. The output of amplifier 39 is forced to ground potential because of its hard-over input unbalance; thus, with no alternating current signals available at the output of operational amplifier 39 and with junction 49 being placed at ground potential, all succeeding stages of the power converter are effectively biased into a non-operating mode. Thus, all transistors are protected from the disturbance. Only by removal of the source of excessive current demand by the load and by removal and re-supply of the input direct current to amplifier 166 will the overload protective circuit be switched from its dominating protective condition. With respect to FIGS. 1 and 2, it will be understood that in the usual aircraft installation, the unidirectional energization voltages applied in FIGS. 1 and 2 at terminals 30, 38, 45, 51, 91, 98, and 174 will normally be supplied from the aircraft primary direct current supply. For simplicity, the invention does not utilize a negative supply for operational amplifiers 39, 166, but operates with +28 volts and ground connected to the amplified supply terminals. Terminals 9, 11, 14, 16, 34, 35, 43, 49, and 174 are therefore biased at +14 volts with respect to ground (supplies not shown). However, the circuit may be operated in the more usual manner, as will be understood by those skilled in the art, with both positive and negative power supplies coupled to amplifiers 39, 166 (+15 volts).

Accordingly, it is seen that the invention provides a compact and efficient active arrangement for permitting aircraft instruments and controls originally intended to operate from three-phase aircraft power supplies to operate equally well with aircraft power supply systems generating direct current power and only limited power levels of single-phase alternating current. Use of a portion of the direct current power for quadrature power alternating current signal generation advantageously reduces the demand placed by the invention upon the relatively low power single-phase generator. Further, use of the aircraft single-phase power output as a phase and frequency reference signal makes unnecessary the phase synchronizing elements or tuned circuits required in conventional static inverters and their attendant cost and size disadvantages. Size and cost factors are further constricted, since integrated circuit packaging techniques are readily applied in designing the invention. In fact, the relatively small size attained by use of the invention permits it to be incorporated directly into an instrument or control whose three-phase output it is to employ. The novel invention reduces the demand placed upon the relatively low level aircraft single-phase power by augmenting it with direct current energy. Size and cost are further minimized by using the single-phase power as a reference for quadrature signal generation and also as a direct contributor to the final three-phase power level with corresponding similar input and output levels; a power and phase converter according to the present invention occupies only a third of the volume needed for a static inverter at a cost as low as about 15 percent of the cost of such an inverter. While the power converter is a novel and useful entity in itself as described in connection with FIG. 1, its reliability and utility are greatly enhanced when the novel protective circuit of FIG. 2 is cooperatively employed. The protective circuit operates to eliminate damage to the power converter when excessive overload current is inadvertently drawn for any cause. Thus, the novel power converter is protected from failures occurring in normal operation and also from wiring connection errors made in the aircraft during initial assembly or repair. Furthermore, the novel protective circuit operates also to protect itself by forcing the operator to clear the offending defect before the system can again be recycled into normal operation.

While the invention has been described in its preferred embodiments, it is to be understood that words which have been used are words of description rather than of limitation and that changes within the purview of the appended claims may be made without departing from the true scope and spirit of the invention in its broader aspects.

We claim:

1. Power conversion apparatus adapted to be responsive jointly to aircraft single-phase alternating current power supply means and to aircraft direct current power supply means for generating three-phase alternating current aboard an aircraft of substantially greater power level than the power level of said aircraft single-phase power supply means, comprising:
   network means for shifting the phase of said single phase alternating current by substantially 90°,
   first amplifier means having an input responsive to said network means,
   push-pull power amplifier means responsive to said first amplifier means,
   first transformer means having first primary and first secondary means,
      said first primary means being responsive to said push-pull power amplifier means,
      said first secondary means having first center tap means,
   second transformer means having second primary and second secondary means,
      said second primary means being responsive to said single phase alternating current,
      said second secondary means having neutral tap means,
   said first center tap means being coupled to a first end of said second secondary means,
   said neutral tap means providing neutral output coupling means,
      a second end of said second secondary means providing a first phase output signal,
      a first end of said first secondary means providing a second phase output signal, and
      a second end of said first secondary means providing a third phase output signal.

2. Apparatus as described in claim 1 wherein said first and second transformer means are so disposed and electrically interconnected that, with respect to the phase of said single phase alternating current that:
   the phase angle of said first phase output signal is substantially 0°,
   the phase angle of said second phase output signal is substantially 120°, and
   the phase angle of said third phase output signal is substantially 240°.

3. Apparatus as described in claim 1 further including first feed back means responsive to said first amplifier means for additionally coupling a direct current gain-controlling signal to said first amplifier means input.

4. Apparatus as described in claim 3 further including inductive isolation means for coupling only alternating current from said first amplifier means into said push-pull power amplifier means.

5. Apparatus as described in claim 4 further including second feed back means responsive to said push-pull power amplifier means for additionally coupling an alternating current gain-controlling signal to said first amplifier means input.

6. Apparatus as described by claim 5 wherein at least said first amplifier means and said push-pull power amplifier means are adapted for energization by said aircraft direct current power supply means.

7. Apparatus as described in claim 6 wherein said inductive isolation means and said push-pull power amplifier means cooperate to supply 180° out of phase versions of said network means 90° phase shifted output to the ends of said first primary means.

* * * * *